H. W. HILL.
LENS BLOCK MOLDING MACHINE.
APPLICATION FILED JAN. 18, 1919.
1,433,818.
Patented Oct. 31, 1922.
3 SHEETS—SHEET 1.
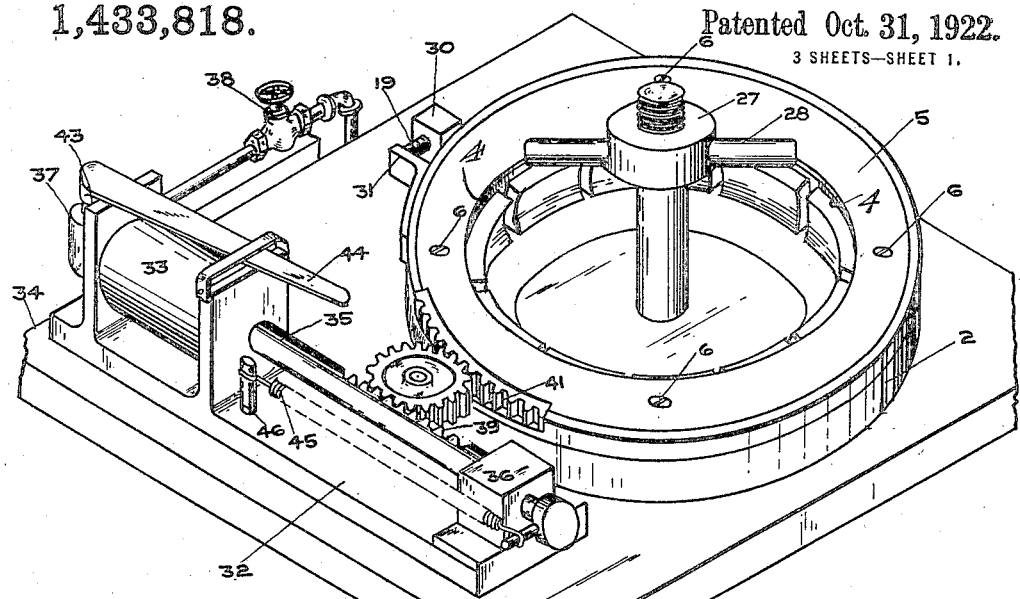
FIG. I
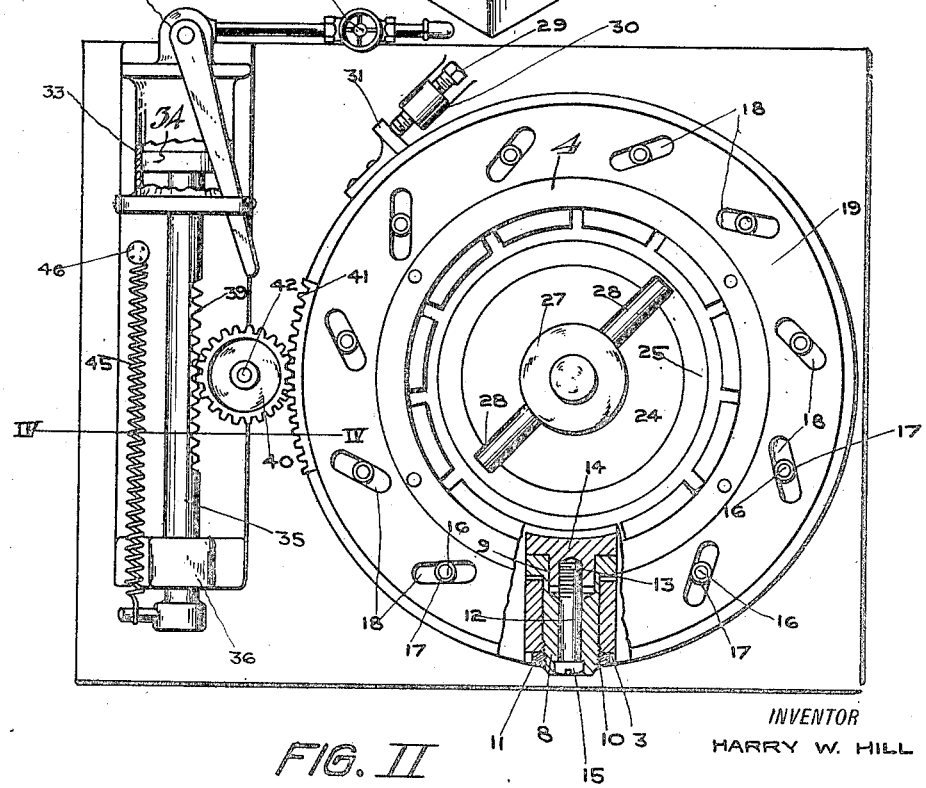
FIG. II
INVENTOR
HARRY W. HILL
BY
H. H. Styll & H. K. Parsons
ATTORNEYS H. W. HILL.
LENS BLOCK MOLDING MACHINE.
APPLICATION FILED JAN. 18, 1919.
1,433,818.
Patented Oct. 31, 1922.
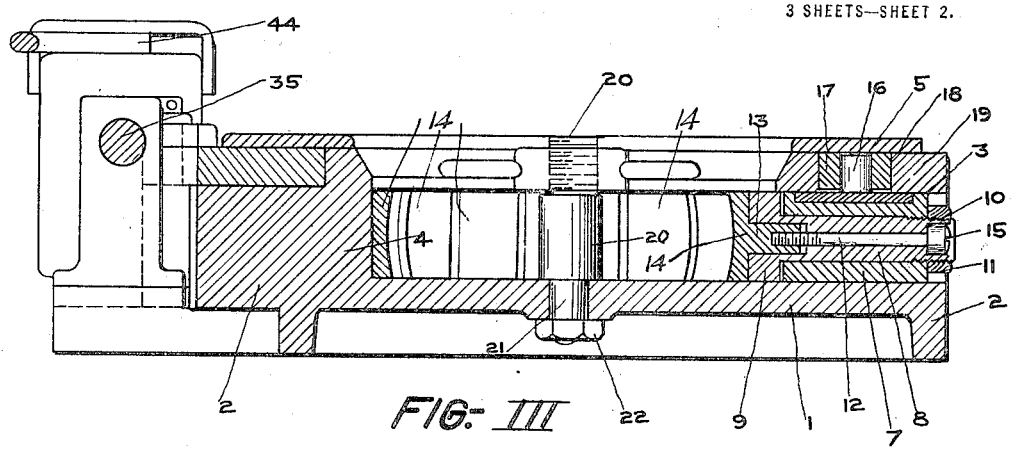
FIG. III
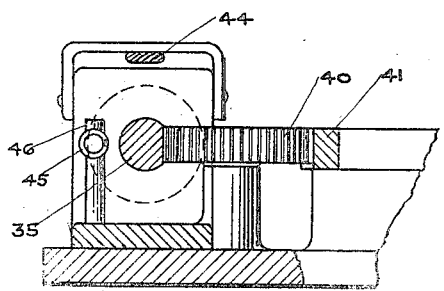
FIG. IV
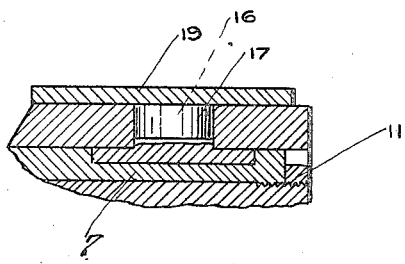
FIG. V
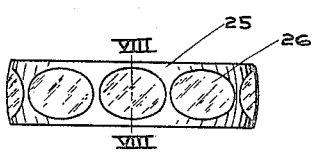
FIG. VIII
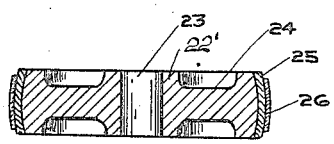
FIG. IX
INVENTOR
HARRY W. HILL

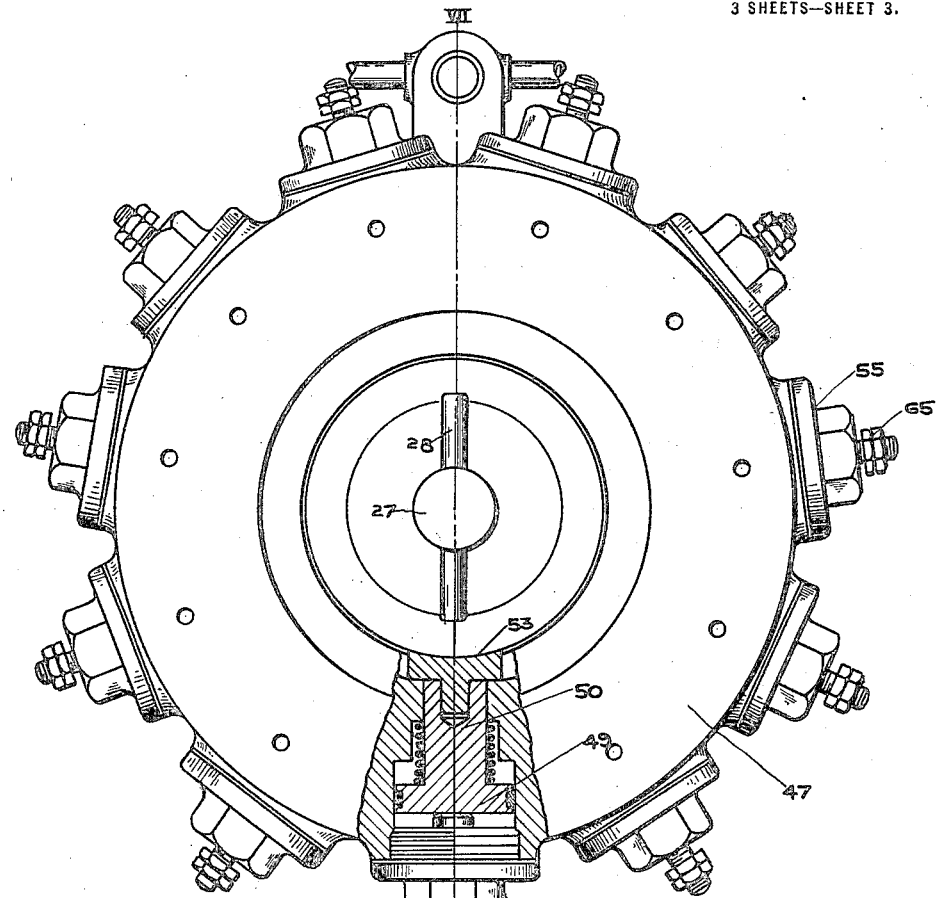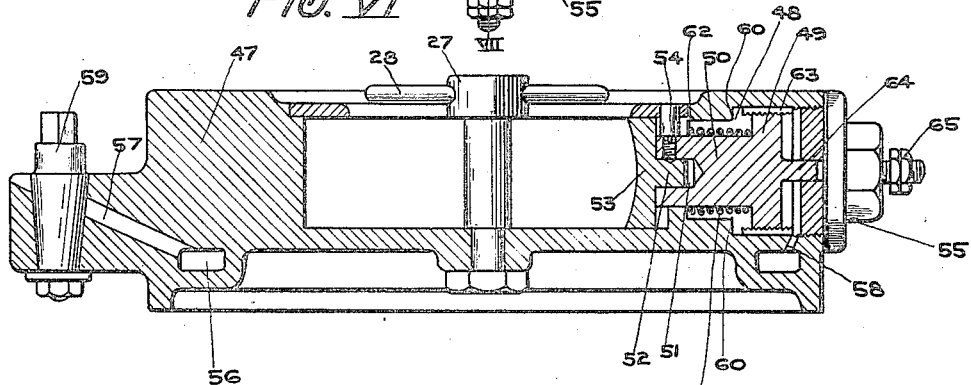

Patented Oct. 31, 1922.

1,433,818

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-BLOCK-MOLDING MACHINE.

Application filed January 18, 1919. Serial No. 271,873.

*To all whom it may concern:*

Be it known that I, HARRY W. HILL, a citizen of the United States, residing at Southbridge, in the county of Worcester and State of Massachusetts, have invented certain new and useful Improvements in Lens-Block-Molding Machines, of which the following is a specification.

This invention relates to new and useful improvements in lens block molding machines, and more particularly to a machine of this character wherein the use of compressed air is adopted for applying pressure to the mould blocks, and the main object of the present invention is the provision of a lens block molding machine wherein a plurality of impressions will be created upon the lens block.

Another object of the present invention is the provision of a lens block molding machine for simultaneously creating a plurality of impressions on a lens block, and wherein compressed air is used for simultaneously operating the blocks which create the impression, and means is also provided for disengaging the blocks from the mould upon releasing the air pressure.

Another object of the present invention is the provision of a lens block molding machine wherein the use of compressed air is adopted for simultaneously creating a number of impressions on a lens block, and additional means provided for determining the correct pressure to be applied to the block in order to obtain the correct impression.

A still further object of the invention is the provision of a lens block molding machine including a removable support for a plurality of lenses, said support being adapted to be removably arranged within the machine, whereby pressure is applied to the exterior thereof to provide a plurality of lens impressions, and as soon as the pressure has been released from the lens support the same can be quickly and readily removed and arranged for another similar member.

With the above and other objects in view the invention consists in the novel features of construction and the combination and arrangement of parts hereinafter more fully set forth, pointed out in the claims and shown in the accompanying drawings, in which:

Figure I is a perspective view of a lens block mould constructed in accordance with my invention.

Figure II is a top plan view, parts thereof being broken away and illustrated in section.

Figure III is a transverse sectional view.

Figure IV is a detailed sectional view taken on the line IV—IV of Figure II.

Figure V is a detailed transverse sectional view.

Figure VI is a top plan view illustrating a slightly modified form of the invention, parts thereof being broken away and illustrated in cross section.

Figure VII is a transverse sectional view taken on the line VII—VII of Figure VI.

Figure VIII is a side elevation of the lens holder.

Figure IX is a transverse sectional view of the same.

In the construction of my improved lens block mould I provide a casing which includes a base plate 1 and a circumferential casting 2 arranged around the outer edge of the base plate upon the upper face thereof, and provided at intervals with a plurality of transverse openings 3, and extending upwardly from the casting 2 upon the inner edge thereof is an annular flange 4 to which the top plate 5 is removably attached. This top plate 5 is removably secured to the annular flange 4 by means of the screw bolts 6 whereby the same may be readily removed for obtaining access to the openings 3 in the casting 2.

Movably disposed within the openings 3 are the sleeves 7 carrying upon the interior thereof the piston rods 8 which actuate the pistons 9 secured to the inner end thereof and are securely held in place by having their outer ends threaded as shown at 10 and the nuts 11 engaged over the threaded end and adapted to abut the outer ends of the sleeves 7. Extending longitudinally through the piston rods 8 are the rods 12, the inner ends of which are engaged with the interiorly threaded lugs 13 formed upon the mould blocks 14, thus securely connecting these blocks 14 with the piston 8 and movable sleeve 7. It will be noted that the outer end of the rod 12 is provided with a screw head 15 whereby the rod may be easily engaged with the lug 13.

The sleeve 7 which is arranged within each one of these openings 3 is provided with an outstanding stud 16 having a bearing collar 17 arranged thereover. It will be noted that the studs 16 project upwardly into elongated openings 18 which are tangentially disposed with respect to the center of the machine as illustrated in Figure I. These slots 18 are formed within a rotatable plate 19 which is mounted upon the upper face of the casting 2 and disposed upon the outer side of the annular flange 4, and it will be noted that this plate 19 is securely retained in position by means of the detachable plate 5. From this description, taken in connection with the accompanying drawings, it will be readily apparent that upon rotation of the circular plate 19, the studs 16 will be moved within the slots 18 whereby it will impart a reciprocating movement to the sleeves 7 within the openings 3, which in turn will communicate a reciprocating movement to the blocks 14 whereby to move them toward or away from the lens block 22'.

Extending upwardly from the base member 1 and arranged centrally thereof is a bearing post 20 provided with a reduced end 21 extending down through an opening in the base and having a nut 22 threaded upon its lower end to securely retain said post in an upright position upon the base. The lens carrying member 22' which is mounted upon this post 20, includes a central sleeve 23 connected by means of a web 24 with an outer ring 25 adapted to be engaged by the blocks 14 to provide impressions for the lenses 26. It is to be understood that the outer face of the ring 25 may be formed in such a manner that various shapes of blocks may be used, from which it will be taken that the outer surface may be formed for applying either toric or straight lenses thereto. In arranging the lens support or carrier within the machine, the collar 23 is arranged over the post 20, and a securing plate 27 is threaded upon the upper reduced end of the post 20 and tightened down onto the central sleeve 23. The plate 27 is provided with oppositely projecting handle members 28 adapted to be grasped, whereby the plate 27 may be readily tightened upon the post 20.

It will be noted from the above that as the plate 19 is rotated upon the casting 2, and the studs 16 moved toward the inner ends of the slots 18, the blocks 14 will be forced into contact with the ring upon the central carrier, thus applying suitable pressure to the pitch which is applied thereto for forming the desired moulds or impressions therein. The limit of the movement of the plate 19 is predetermined by means of a set screw 29 threaded through a lug 30 carried by the casting 2 and the inner end of said set screw engaging with a stop member 31 which is carried by the plate 19, thus as the plate 19 moves around to where the stop 31 engages with the end of the set screw 29, the desired pressure will have been applied to the ring 25. The required pressure is determined through the adjustment of the set screw 29 within the lug 30.

The operating mechanism used for applying movement to this plate 19 is arranged adjacent the casting 20, illustrated in Figure I, and includes a base plate 32 supporting a cylinder 33, in which a piston 34 is movably disposed, having a piston rod 35 connected therewith, the outer end of which is movable within a guide 36. Connected with one end of the cylinder 33 is an air inlet 37 connected to a suitable source of supply by means of the valve 38.

In order to connect the piston 35 with the movable plate 19 the piston 35 is provided upon one side thereof with a plurality of teeth 39 and movable thereover is a pinion 40, said pinion engaging the series of teeth 41 formed upon the exterior of the plate 19, thus as the piston rod 35 is reciprocated, a rotary movement will be imparted to the plate 19 through the pinion 40 which is mounted upon a pivot post 42. Connected to the valve 43, which actuates the piston 34 within the cylinder 33, is a suitable handle 44 extending inwardly toward the machine, whereby the same will be in a position to be readily grasped by the party operating the machine so that an air supply can be readily admitted to the cylinder for reciprocating the piston therein. As soon as the plate 19 has been moved the required distance so that the stop 31 engages with the end of the set screw 29, the air pressure is released and the piston 34 returned to its normal position by means of a coil spring 45, one end of which is connected to the outer end of the piston 35 and the other end thereof secured to a stationary post 46 carried by the base plate 32.

From the above description taken in connection with the accompanying drawings, it will be apparent that the operation of my improved lens block mould will be carried out as follows: First, the support is arranged within the machine upon the post 20; the plate 27 is then threaded upon the upper end of the post 20 and engaged with the central portion of the lens carrier for securely retaining the carrier in position within the machine. The handle 44 is then actuated to admit a supply of air to the cylinder 33 wherein the piston 34 is reciprocated within the cylinder 33, and the rod 35 actuated to impart movement to the plate 19, which in turn will convey a reciprocating movement to the piston rods 8 within the openings 3, through the movement of the studs 16 within the slots 18. From this it will be apparent that the blocks 14 will be moved inwardly into contact with the ring 25, and as the plate 19 has been moved to a position wherein the stop 31 engages the end of the set screw 29, sufficient pressure will have been applied to the ring 25 and the handle member 44 is then actuated to cut off the supply of air and permit the piston to be returned to its normal position, this being carried out through the tension of the coil spring 45.

In Figure VI, I have illustrated a slightly modified form of the invention, wherein the compressed air is applied directly to the plungers operating the lens blocks. In this form of the invention I provide a casting generally indicated by the numeral 47, which in the present instance is circular in form, and within this casting I provide a plurality of transverse openings 48. It will be noted that the bottom of the casting extends over the entire lower surface of the device, while the upper or top of the casting is provided with an enlarged central opening, the lower casting forming the base member for the machine.

Mounted for reciprocating movement within the openings 48 are the pistons 49, having reduced portions 50 extending inwardly toward the center of the casting and movable within reduced portions of the openings 48. The piston rods, which we will hereinafter term the reduced portions 50, are provided with a central aperture 51, in which the shanks 52 of the blocks 53 are arranged, the shanks 52 being securely retained within the apertures 51 by means of the set screws 54. In this form of the invention the lens carrier or supporting member is the same as in the preferred form illustrated in Figures I to V inclusive, and is mounted within the casting and retained therein in an operative position in the same general manner.

The openings 48 are normally closed at the outer ends by means of a cap 55 threaded into the openings and adapted to be readily removed when it is desired to gain entrance to the openings 48 from the exterior of the casting for the purpose of removing the pistons 49. Formed integrally with the casting 47 and arranged upon the lower face thereof is a circular chamber 56 which in the present instance is used as an air chamber to convey the air from the inlet port 57 to the various inlet ports 58 which provide communication between the chamber 56 and the chambers provided by the openings 48, whereby to reciprocate the pistons 49 within said openings and bring the blocks 53 into contact with the ring 25 upon the central support.

The supply of air to the chamber 56 through the inlet 57 is regulated by means of a valve 59, whereby the air may be readily admitted into the chamber 56, where it will be distributed into the various chambers formed by the openings 48 so as to simultaneously reciprocate the pistons 49. The inward movement of the pistons 49 is limited by having the inner ends of the pistons contacting with the shoulders 60, and as soon as the air is released by turning the valve 59, the coil springs 61, which are mounted upon the piston rods 50, will return the pistons 49 to the outer ends of the openings 48. These coil springs are mounted upon the piston rods 50 and disposed between the pistons and the shoulders 62 within the openings 48.

From the above description taken in connection with the accompanying drawings, it will be readily apparent that the operation of that form of the invention illustrated in Figure VI is as follows: After the lens carrier or support has been arranged in position within the central portion of the machine, air is admitted to the chamber 56 through the inlet 57, passes into the chambers formed by the openings 48; the pistons 49 will then be reciprocated to bring the blocks 53 into contact with the ring 25, the required amount of pressure being determined by the adjustment of the outer shell 63 upon the piston 49, whereby the end of the shell will engage the shoulders 60 limiting the inward movement of the piston. After the required pressure has been applied to the ring, the supply of air is cut off and the coil springs 61 return the pistons 49 to their normal positions.

In Figure VII, I have illustrated a slightly modified form of stop which includes a guide rod 64 connected with the piston 49 and adapted to be reciprocated within an opening formed within the stop plate 55, said rod having threaded upon its outer end an adjusting nut 65, said nut being adjusted according to the required pressure which is to be applied to the lenses and said nut engaging with the outer face of the plate 55 to limit the inward movement of the pistons 49. It will be apparent from the foregoing that if so desired this form of stop can be used in place of the movable shell 63 which is applied to the piston 49. The operation of the machine in either event will be the same.

I claim:

1. A machine for use in the manufacture of lenses, comprising a casing having a circular central open space and a central lens block wheel receiving stud, said casing having a plurality of plungers mounted therein radially shiftable as respects the circular opening and each provided with a presser head movable into the open space and adapted to form a lens receiving seat on the block, and means for simultaneously equally shifting the several plungers to form a plurality of corresponding lens receiving seats on a lens block when contained within the aperture.

2. A molding machine, including a casing, a central lens block support therein, movable pressing blocks carried by the casing for co-operation with the support, means carried by the casing for reciprocating the blocks and means for varying the limit of movement of said blocks.

3. A molding machine, including a casing, movable pressing blocks within the casing, a movable top for the casing, means forming connection between the top and the pressing blocks to inwardly radially shift the pressing blocks, means co-acting with the top for actuating the same, and means to limit the movement of the top and thus the inward movement of the blocks.

4. A molding machine, including a casing, a movable top therefor, a lens block support therein, movable pressing blocks within the casing for engagement with the lens block, means connecting the blocks with the movable top, means for imparting movement to said top to inwardly radially shift the pressing blocks, an adjustable screw carried by the casing and a stop carried by the movable top for engaging the screw whereby to limit the movement of the top.

5. A molding machine, including a casing, a lens block support therein, a movable top therefor, movable pressing blocks within the casing, means forming connection between the blocks and the movable top, a series of teeth formed on the edge of the movable top at one side thereof, a reciprocating rod having teeth on one side thereof, a pinion forming connection between the rod and the movable top, and means for imparting movement to the rod to rotate the top and impart movement to the pressing blocks.

6. A molding machine including a casing, a lens block support therein, a movable top for the casing, movable pressing blocks arranged within the casing, means for connecting the blocks with the movable top, a reciprocating rod, means for imparting movement to the rod, means forming connection between the rod and the movable top whereby to inwardly radially shift the pressing blocks and an adjustable stop for the movable top to limit the movement of the pressing blocks.

7. A molding machine, including an annular casing, a lens block support therein, radially movable pressing blocks within the casing, means for imparting movement to the pressing blocks, means for limiting the movement of said blocks in one direction, and means for returning the pressing blocks to their first position after the movement imparting means has been released.

8. A device of the character described including a base, a lens block support rising from the base, means for securing a lens block in position thereon, an annular support surrounding the block, a plurality of radially sliding presser members carried by the annular support, and means for simultaneously radially shifting the several pressers in the direction of the block.

9. A device of the character described including a base, a lens block support rising from the base, means for securing a lens block in position thereon, an annular support surrounding the block, a plurality of radially sliding presser members carried by the annular support, means for simultaneously radially shifting the several pressers in the direction of the block, and adjustable means for limiting the movement of the pressers in the direction of the block.

10. A device of the character described including a base, a lens block support rising from the base, means for securing a lens block in position thereon, an annular support surrounding the block, a plurality of radially sliding presser members carried by the annular support, and means for simultaneously radially shifting the several pressers in the direction of the block, and for reversely shifting said pressers.

In testimony whereof I have affixed my signature in presence of two witnesses.

HARRY W. HILL.

Witnesses:
H. E. COLEMAN,
ESTHER M. LAFLER.